(12) United States Patent
McPherson et al.

(10) Patent No.: US 11,481,408 B2
(45) Date of Patent: Oct. 25, 2022

(54) EVENT DRIVEN EXTRACT, TRANSFORM, LOAD (ETL) PROCESSING

(71) Applicant: Amazon Technologies, Inc., Seattle, WA (US)

(72) Inventors: George Steven McPherson, Seattle, WA (US); Mehul A. Shah, Saratoga, CA (US); Prajakta Datta Damle, San Jose, CA (US); Gopinath Duddi, San Jose, CA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 15/385,787

(22) Filed: Dec. 20, 2016

(65) Prior Publication Data

US 2018/0150529 A1 May 31, 2018

Related U.S. Application Data

(60) Provisional application No. 62/426,574, filed on Nov. 27, 2016.

(51) Int. Cl.
*G06F 17/00* (2019.01)
*G06F 16/25* (2019.01)
*G06F 9/54* (2006.01)

(52) U.S. Cl.
CPC ............ *G06F 16/254* (2019.01); *G06F 9/542* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 8,024,369 B2 * | 9/2011 | Pellegrini | G06F 9/5038 |
| | | | 707/758 |
| 8,136,158 B1 | 3/2012 | Sehr et al. | |
| 8,380,657 B2 | 2/2013 | Shaik et al. | |
| 8,752,047 B2 | 6/2014 | Banga et al. | |
| 8,788,931 B1 | 7/2014 | Chen et al. | |
| 9,430,114 B1 | 8/2016 | Dingman et al. | |
| 9,471,775 B1 | 10/2016 | Wagner et al. | |
| 9,684,785 B2 | 6/2017 | Walsh | |

(Continued)

OTHER PUBLICATIONS

U.S. Appl. No. 15/385,764, filed Dec. 20, 2016, Mehul A. Shah et al.

(Continued)

*Primary Examiner* — Hung D Le
(74) *Attorney, Agent, or Firm* — S. Scott Foster; Kowert, Hood, Munyon, Rankin & Goetzel, P.C.

(57) ABSTRACT

Extract, Transform, Load (ETL) processing may be initiated by detected events. A trigger event may be associated with an ETL process apply one or more transformations to a source data object. The trigger event may be detected for the ETL process and evaluated with respect to one or more execution conditions for the ETL process. If the execution conditions for the ETL process are satisfied, then the ETL process may be executed. At least some of the source data object may be obtained, the one or more transformations of the ETL process may be applied, and one or more transformed data objects may be stored.

20 Claims, 8 Drawing Sheets

(56) References Cited

U.S. PATENT DOCUMENTS

| | | | |
|---|---|---|---|
| 9,898,515 B1 | 2/2018 | Avagyan et al. | |
| 2002/0059566 A1 | 5/2002 | Delcambre et al. | |
| 2003/0196193 A1 | 10/2003 | Kuzmin | |
| 2004/0215584 A1 | 10/2004 | Yao | |
| 2004/0249644 A1* | 12/2004 | Schiefer | G06Q 10/10 |
| | | | 705/7.37 |
| 2005/0097561 A1 | 5/2005 | Schumacher et al. | |
| 2005/0273772 A1 | 12/2005 | Matsakis et al. | |
| 2005/0283622 A1 | 12/2005 | Hall et al. | |
| 2007/0203719 A1 | 8/2007 | Kenagy et al. | |
| 2007/0203923 A1 | 8/2007 | Thomas | |
| 2007/0239636 A1* | 10/2007 | Tang | G06N 7/005 |
| | | | 706/20 |
| 2007/0266426 A1 | 11/2007 | Iyengar et al. | |
| 2008/0052534 A1 | 2/2008 | Harada et al. | |
| 2008/0104014 A1 | 5/2008 | Burger et al. | |
| 2008/0147673 A1* | 6/2008 | Candea | G06F 16/254 |
| 2009/0177671 A1 | 7/2009 | Pellegrini et al. | |
| 2009/0192979 A1* | 7/2009 | Lunde | G06F 11/1461 |
| 2010/0058291 A1 | 3/2010 | Hahn et al. | |
| 2010/0174754 A1* | 7/2010 | B'Far | G06F 16/211 |
| | | | 707/794 |
| 2010/0218134 A1* | 8/2010 | B'Far | G06Q 10/10 |
| | | | 715/764 |
| 2010/0274750 A1 | 10/2010 | Oltean et al. | |
| 2011/0023028 A1 | 1/2011 | Nandagopal et al. | |
| 2011/0107383 A1 | 5/2011 | Barton et al. | |
| 2011/0154431 A1 | 6/2011 | Walsh | |
| 2012/0042162 A1 | 2/2012 | Anglin et al. | |
| 2012/0054744 A1 | 3/2012 | Singh et al. | |
| 2012/0102007 A1* | 4/2012 | Ramasubramanian | |
| | | | G06F 16/254 |
| | | | 707/705 |
| 2012/0203877 A1 | 8/2012 | Bartholomay et al. | |
| 2013/0167222 A1 | 6/2013 | Lewis | |
| 2013/0173529 A1* | 7/2013 | Erla | G06F 16/254 |
| | | | 707/602 |
| 2013/0290928 A1 | 10/2013 | Johnson | |
| 2014/0279934 A1* | 9/2014 | Li | G06F 16/254 |
| | | | 707/687 |
| 2015/0100542 A1 | 4/2015 | Li et al. | |
| 2015/0106556 A1* | 4/2015 | Yu | G06F 13/1694 |
| | | | 711/103 |
| 2015/0113009 A1 | 4/2015 | Zhou et al. | |
| 2015/0227599 A1* | 8/2015 | Yokoi | G06F 11/2028 |
| | | | 707/634 |
| 2015/0286701 A1 | 10/2015 | Wideman | |
| 2015/0347539 A1* | 12/2015 | Holmes | G06F 16/254 |
| | | | 707/602 |
| 2015/0347541 A1 | 12/2015 | Holmes et al. | |
| 2015/0356293 A1 | 12/2015 | Biswas | |
| 2015/0370871 A1* | 12/2015 | Bender | G06F 16/254 |
| | | | 707/602 |
| 2016/0180084 A1 | 6/2016 | Spurlock et al. | |
| 2016/0224360 A1 | 8/2016 | Wagner et al. | |
| 2016/0224785 A1 | 8/2016 | Wagner et al. | |
| 2016/0246809 A1 | 8/2016 | Romano et al. | |
| 2016/0259628 A1 | 9/2016 | Schuchman et al. | |
| 2016/0314175 A1* | 10/2016 | Dhayapule | G06F 16/9024 |
| 2016/0360009 A1 | 12/2016 | Borley et al. | |
| 2017/0092060 A1* | 3/2017 | Toohey | G07F 17/3244 |
| 2017/0126795 A1 | 5/2017 | Kumar et al. | |
| 2017/0154019 A1 | 6/2017 | Filipsk et al. | |
| 2017/0161344 A1* | 6/2017 | Vasireddy | G06F 16/254 |
| 2017/0213037 A1 | 6/2017 | Toledano et al. | |
| 2017/0220613 A1 | 8/2017 | Gass et al. | |
| 2018/0039490 A1 | 2/2018 | Gass et al. | |
| 2018/0129497 A1 | 5/2018 | Biddle et al. | |
| 2018/0157703 A1 | 6/2018 | Wang et al. | |
| 2018/0157842 A1 | 6/2018 | Holz et al. | |
| 2018/0189350 A1 | 7/2018 | Imaki | |
| 2018/0189510 A1 | 7/2018 | Seko | |
| 2018/0276781 A1 | 9/2018 | Oliveria et al. | |
| 2018/0365305 A1* | 12/2018 | Li | G06F 16/254 |

OTHER PUBLICATIONS

U.S. Appl. No. 15/385,772, filed Dec. 20, 2016, Mehul A. Shah et al.

U.S. Appl. No. 15/385,784, filed Dec. 20, 2016, George Steven McPherson et al.

U.S. Appl. No. 15/385,789, filed Dec. 20, 2016, George Steven McPherson et al.

U.S. Appl. No. 15/385,777, filed Dec. 20, 2016, Mehul A. Shah et al.

International Search Report and Written Opinion from PCT/US2017/063271, dated Jan. 25, 2018, Amazon Technologies, Inc., pp. 1-17.

Bratko, A. et al., "Exploiting Structural Information for semi-structured document categorization", Information Processing & Management, Dated May 1, 2006, vol. 42, No. 3, pp. 679-694.

Juan Trujillo et al., "A UML Based Approach for Modeling ETL Processes in data warehouses", In: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.

Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.

Summons to attend oral proceeding mailed Jun. 29, 2022 in European patent application No. 17811800.6, Amazon Technologies, Inc.

Anonymous, "Method and system for scheduling ETL process with flexibiltiy by utilizing a subsidiary scheduler," Ed. Darl Kuhn, Nov. 15, 2013, ip.com, IP.COM Inc, West Henrietta, NY, US, pp. 1-11.

Vincenzo Oeufemia et al: "A visual language-based system for extraction-transformation-loading development", Software—Practice and Experience, May 20, 2013, vol. 44, No. 12, pp. 1417-1440.

* cited by examiner

EVENT DRIVEN EXTRACT, TRANSFORM, LOAD (ETL) PROCESSING

RELATED APPLICATIONS

This application claims benefit of priority to U.S. Provisional Application Ser. No. 62/426,574, entitled "Event Driven Extract, Transform, Load (ETL) Processing," filed Nov. 27, 2016, and which is incorporated herein by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. The increasing amount of data that organizations must store and manage often correspondingly increases both the size and complexity of data storage and management technologies, like database systems, which in turn escalate the cost of maintaining the information. New technologies seek to reduce both the complexity and storage requirements of maintaining data by introducing different data formats that offer different processing or maintenance capabilities. However, introducing multiple data formats is not without cost. Data is often processed by different systems which may not support the current data format of the data. Thus, the ability to perform techniques that extract, transform, and load data between different formats or locations is desirable.

Figure 1:
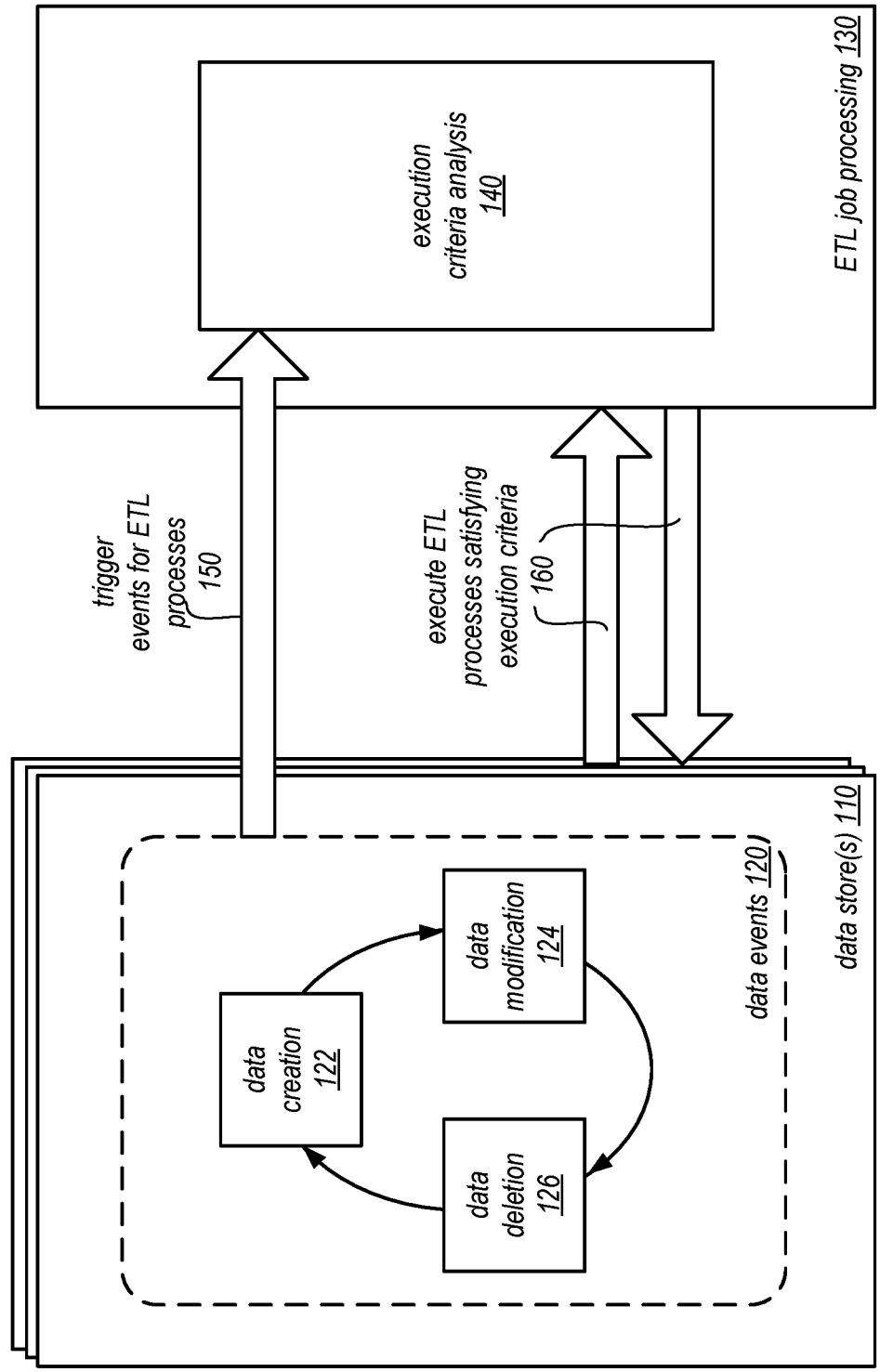
FIG. 1 illustrates a logical block diagram of event driven extract, transform, load (ETL) processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of event driven extract, transformation, and load (ETL) processing are described herein. ETL processing provides data administrators, stake holders, producers, or consumers with the ability to take advantage of different data formats, storage systems, or storage locations by facilitating the movement data across different data stores and data schemas or formats. For example, data producers that collect usage and other analytics for web site interactions (e.g., visitor clicks and other actions), may generate stored analytics data in large log files or other semi-structured data formats. However, in order to perform various analytical operations or queries over the analytics data, an ETL process may be performed to extract desired data, transformed the desired data into a format usable by an analytics engine, like a database system, and load the extracted data into the appropriate storage system in the appropriate data schema and format.

Typical ETL processing techniques rely upon chronological mechanisms for initiating the execution of ETL processing. An ETL process may be scheduled to execute nightly, or once a week at a certain time on a certain day. However, because ETL processing jobs interact with and transform data, the timing for executing ETL processing jobs may be optimally aligned with changes to data or events respecting data as data is not always created, updated, modified, or deleted upon a schedule, nor created, updated, modified, or deleted in the same way. For instance, new data objects may be created or stored in a data store to add another day's worth of sales data or may be stored as corrections to a larger data set. Event driven ETL processing may discriminate between optimal ETL execution scenarios and non-optimal ETL execution scenarios to account for the differing nature of changes to data.

FIG. 1 illustrates a logical block diagram of event driven extract, transform, load (ETL) processing, according to some embodiments. Data store(s) 110 may store data objects on behalf of one or multiple clients. Data objects may be may any form of data or data structure, (e.g., file, directory, database table, log, block, partition, chunk, or range of bytes). Various data events 120 may occur in a data store with respect to stored data objects. For example, data creation events 122 may result from the storing of new data objects. A data producer, for example, may upload a new log file into data store(s) 120, creating a new data object. In another example, a new partition for database table may be added. Data modification event(s) 124 may occur when data is updated or transformed to create other data objects. For instance, an aggregation operation may be performed to access raw data stored in a data object, aggregate the values of different fields, and store the aggregated values in another data object (e.g., calculate total sales from a data object storing daily transactions and store the total sales for the day in a new entry in a revenue table). Data deletion events 126 may occur to archive, move, or remove data objects from data store(s) 110. For example, raw data objects may be discarded once a cleaned version of the data object is created.

As illustrated in FIG. 1, different data events 120 may serve as trigger events for ETL process 150 that are executed by ETL job processing 130. For example, a trigger event (e.g., triggered by a specified data event 120) may be associated with an ETL process (e.g. in a trigger event registry as discussed below with regard to FIG. 4). ETL job processing 130 may detect the occurrence of the trigger event 150 and determine whether the ETL process should be executed using execution criteria specified for the ETL process. For example, ETL job processing may include execution criteria analysis 140 to compare various attributes of a source data object for the ETL process with different criteria (e.g., size of the source data object with a threshold execution size, number of items, such as rows, within the source data object, with a row threshold, etc.). Other execution criteria, such as those discussed below with regard to FIGS. 4, 6, and 7 may be evaluated, including criteria for evaluating the status of other ETL processes.

If the execution criteria are satisfied, then ETL job processing 130 may execute the triggered ETL process 160. For example, ETL job processing 130 may obtain portions of a source data object in data store(s) 110, apply different transformations as part of the ETL processing, such as transformations that convert, combine or otherwise modify data values obtained from the source data object, remove, filter or drop data values obtained from the source data object, or restructure, rearrange, or relocate data values obtained from the source data object. The results of the applied transformations may be included in one or more transformed data objects which may be stored in data store(s) 110. ETL job processing 130 may create different data events as a result of executing ETL processes and thus may initiate subsequent ETL processing.

Please note that the previous description of event driven ETL processing is a logical illustration and thus is not to be construed as limiting as to the architecture for implementing a data store or ETL job processing.

This specification begins with a general description of a provider network that implements an extract, transform, load (ETL) service that identifies, transforms, and moves data stored in the provider network or in external data stores. Then various examples of the ETL service including different components/modules, or arrangements of components/module that may be employed as part of implementing the ETL service are discussed. A number of different methods and techniques to implement event driven ETL processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
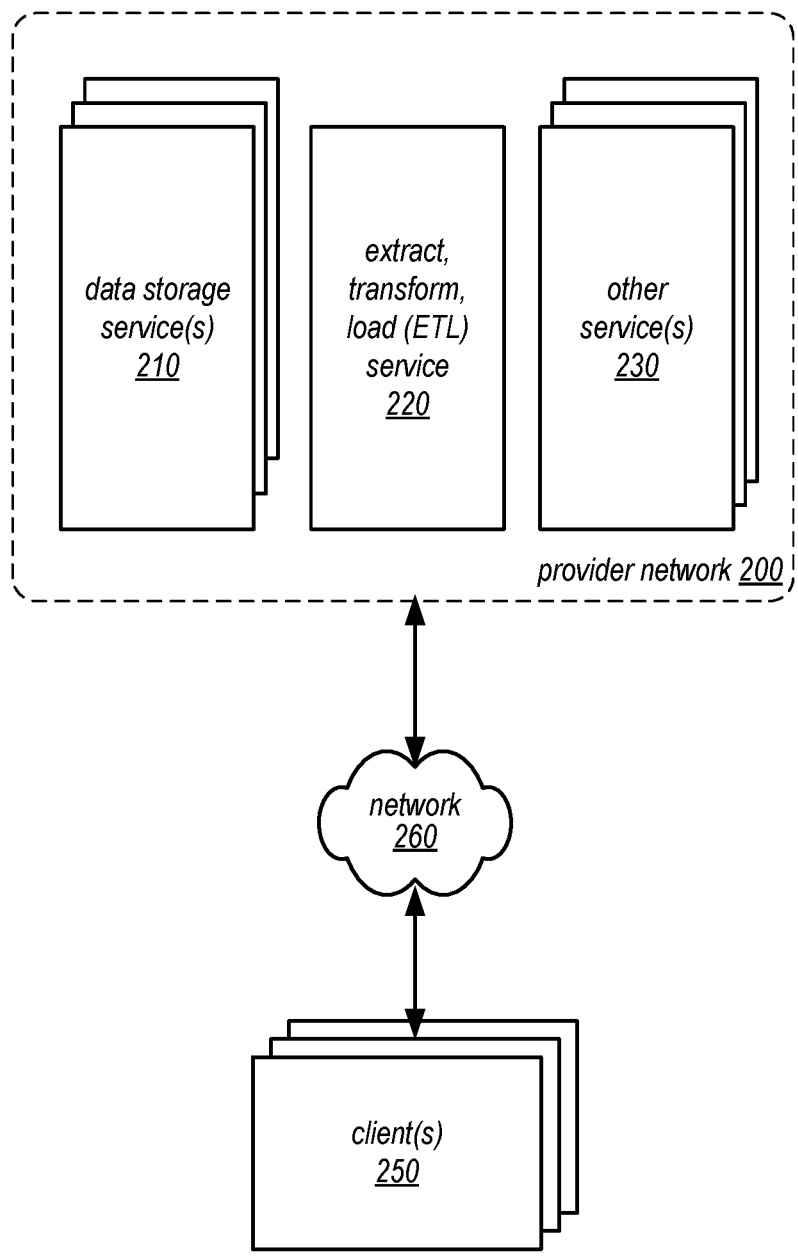
FIG. 2 is a block diagram illustrating a provider network offering different services including an extract, transform, load (ETL) service that performs event driven ETL processing, according to some embodiments.

FIG. 2 is a block diagram illustrating a provider network offering different services including an extract, transform, load (ETL) service that performs event driven ETL processing, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, ETL service 220 may create and dynamically update a catalog of data stored on behalf of clients in provider network 200 across the various data storage services 210, as discussed in detail below with regard to FIG. 3. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 to another location. For example, ETL service 220 may provide clients with the resources to create, maintain, and orchestrate data loading jobs that take one or more data sets, perform various transformation operations, and store the transformed data for further processing (e.g., by one or more of data processing service(s)). ETL service 220 may access a data catalog generated by ETL service 220 in order to perform an ETL operation (e.g., a job to convert a data object from one file type into one or more other data objects of a different file type). As discussed in detail below with regard to FIGS. 3-5, ETL service 220 may generate transformation workflows on behalf of clients automatically.

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of other service(s) 230, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
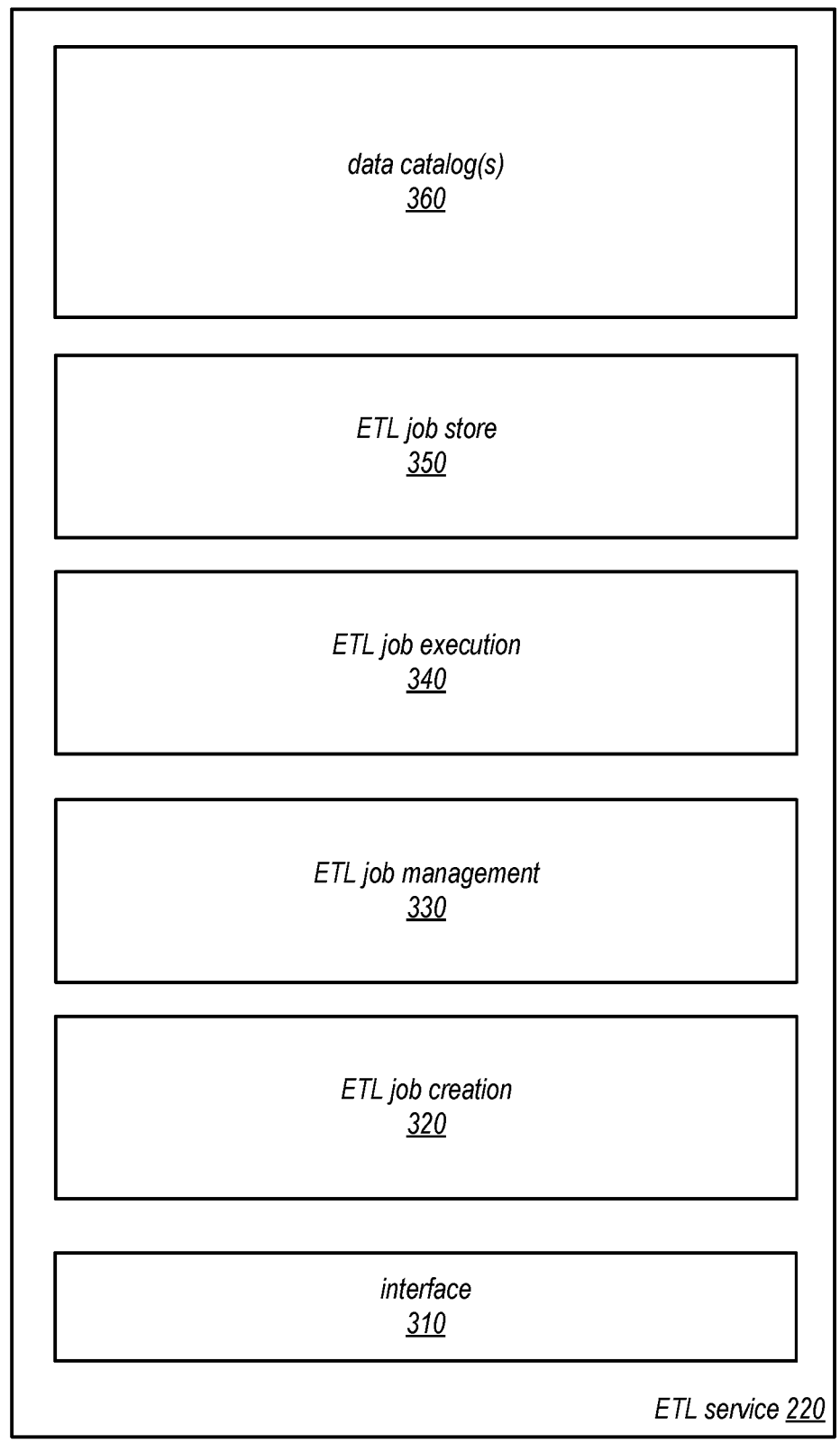
FIG. 3 is a block diagram illustrating an ETL service that performs event driven ETL processing, according to some embodiments.

FIG. 3 is a block diagram illustrating an ETL service that performs event driven ETL processing, according to some embodiments. ETL service 220 may provide access to data catalogs 360 and ETL jobs (for creation, management, and execution) via interface 310, which may be a programmatic interface (e.g., Application Programming Interface (API)), command line interface, and/or graphical user interface, in various embodiments.

ETL Service 220 may implement ETL job creation 320 to handle the creation of ETL jobs through manual job creation (e.g., creating, edit, or uploading ETL code or creating or editing graphs of ETL jobs) or through automated job creation. ETL job creation 320 may handle requests for automated ETL job creation and manual ETL job creation. For example, ETL job creation 320 may receive job generation request which may specify the data object and target data format for the ETL job. Other job information, such as access credentials, triggering events, or any other information to execute the ETL job may be included as part of the creation request or as part of a trigger event registration request, discussed below with regard to FIG. 6. ETL job creation 320 may automatically generate ETL code to perform an ETL job by determining the source data format of the data object and the target data format of the data object. For example, in one embodiment, the source and target data formats from data catalog 360. In another embodiment, data format identification may perform data format recognition techniques, or access other data stores (e.g., such as a data catalog stored in relational database) to retrieve the data format information. ETL job creation 320 may then compare the source data format and target data format or schema to select transformations to apply to the source data object to achieve the target data format. ETL job creation 320 may then generate code for selected transformations and construct the source code for executing the selected transformations. The code for the ETL job may be stored in ETL job store 350 for subsequent execution.

ETL job creation 320 may also implement manual creation of ETL jobs. For example, transformation operations may be manually selected, combined, or assembled via graphical user interface to define a workflow of transformations to apply. Code corresponding to the workflow may be generated (or supplied by a user), edited, and stored for subsequent execution as part of ETL job store 350.

ETL service 220 may implement ETL job management 330 to provide clients with the ability to manage, edit, delete, or otherwise change ETL jobs. Trigger events, may also be defined for ETL jobs (as discussed below with regard to FIG. 6). ETL job management 330 may monitor for trigger events and request execution of ETL jobs, as discussed below with regard to FIG. 4.

ETL service 220 may implement ETL job execution 340 to provide an execution platform ETL jobs. In some embodiments, ETL job execution 340 may provide a serverless architecture (from the perspective of clients) so that the appropriate number of resources are provisioned (e.g., virtual compute instances from a virtual compute service executing the ETL job code) in order to satisfy performance requirements, objectives, or goals provided by a client or by ETL service 220. ETL job execution 340 may execute jobs, in some embodiments, automatically without any user editing changes to the automatically generated ETL code from ETL job creation 320. In some embodiments, ETL job execution 340 may execute automatically generated ETL jobs that were modified. ETL job execution 340 may execute jobs in response to detected triggering events for ETL jobs (which may be detected by ETL job management or another system or service monitoring for triggering event conditions), as discussed below with regard to FIG. 5.

ETL service 220 may maintain data catalogs 360 that describe data sets (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) 360 (e.g., requests to combine, delete, or split tables of metadata in the catalog or edit the metadata determined for a data catalog). ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Storage for data catalog(s) 360 may be implemented by one or more storage nodes, services, or computing devices (e.g., system 1000 discussed below with regard to FIG. 8) to provide persistent storage for data catalogs generated by data catalog service 200. Such storage nodes (or other storage components of storage for data catalog(s) 360) may implement various query processing engines or other request handling components to provide access to data catalogs according to requests received via interface 310. For example, data catalog storage may be implemented as a non-relational database, in one embodiment, that stores file types and other metadata for data objects in table. In some embodiments, collections of metadata for various data objects stored across different storage service(s) 210 on behalf a single user account may be stored together in a single catalog of metadata that may be made accessible to clients.

Figure 4:
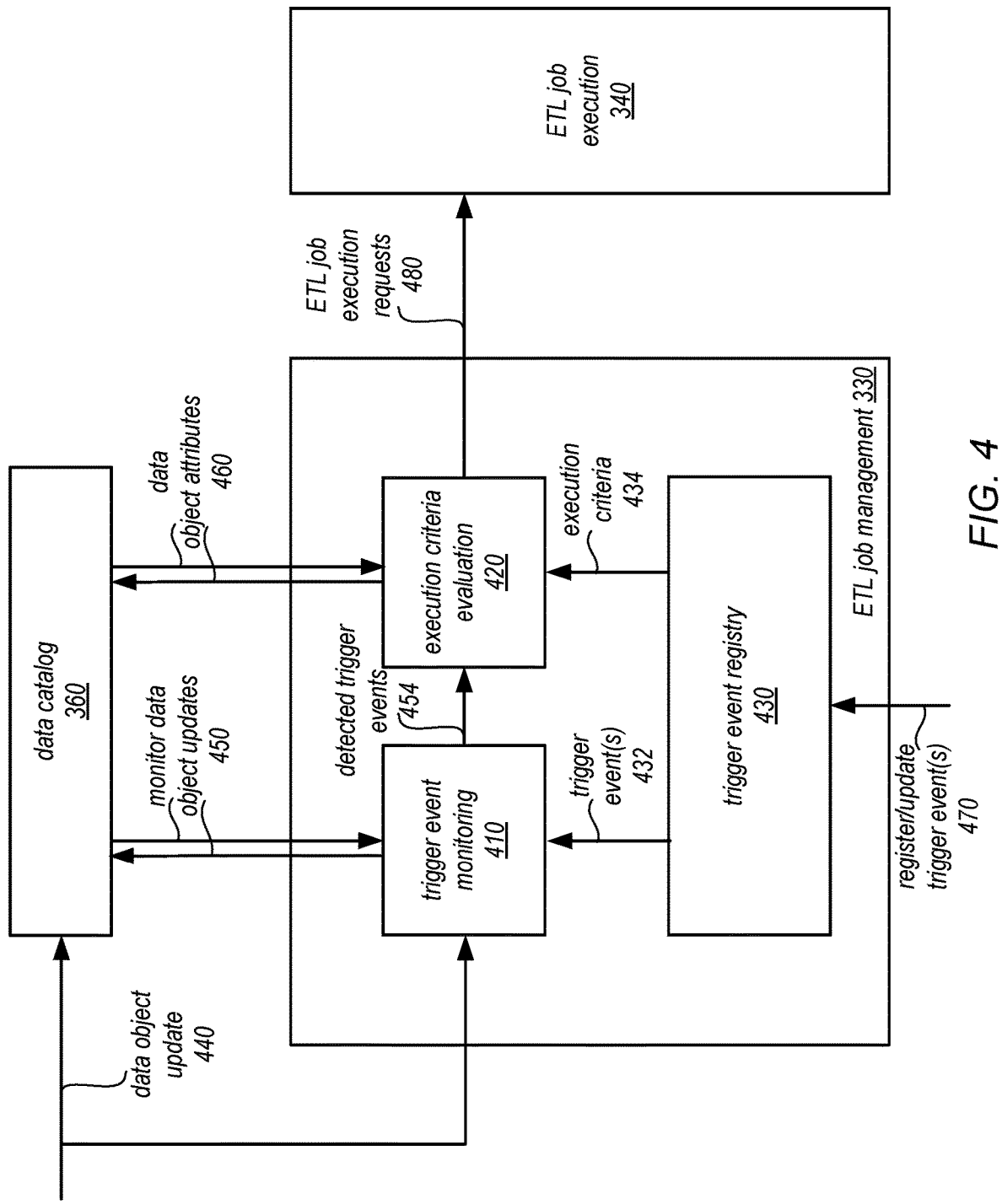
FIG. 4 is a logical block diagram illustrating ETL job management, according to some embodiments.

FIG. 4 is a logical block diagram illustrating ETL job management, according to some embodiments. ETL job management 330 may monitor for trigger events for ETL jobs and request the execution of ETL jobs that satisfy execution criteria for the ETL job. ETL job management 330 may implement trigger event registry 430, in various embodiments. Trigger event registry 430 may be a data store, such as database, or other data storage system that tracks the trigger events 432 for which monitoring is enabled, as well as the execution criteria 434 for evaluating whether an ETL job may be performed. Trigger event registry 430 may be updated by requests 470 to register or update trigger events, as discussed in detail below with regard to FIG. 6. For example, a request 470 to register a trigger event may identify the ETL job, type of trigger event, and execution criteria to be applied for determining whether execution even of the ETL job when the trigger event is detected can proceed.

ETL job management 330 may implement trigger event monitoring 410 to detect trigger events for ETL jobs. For example, trigger event monitoring 410 may implement listeners or other processes that wait and identify events for a specified ETL job. For example, trigger event monitoring 410 may enable a listener for an ETL job that operates upon data source X by configuring the listener to identify updates 440 to data source X amongst update notifications provided to ETL job management 330. In some embodiments, trigger event monitoring 410 may monitor, get, or evaluate data object updates 450 provided 440 to data catalog 360. For example, ETL service 220 may make an interface to data catalog 360 available so that when a data producer, modifier, or other process that accesses a data object in a data store performs an action, a description of the update or a resulting update to the data objects metadata or data schema is provided 440 to data catalog 360 via the interface (e.g., via an API request to report the update). Trigger event monitoring 410 may subscribe to a feed or stream of updates (e.g., particular to a data object in the data catalog or the data catalog as a whole) in order to monitor the data object updates for trigger events. For other types of trigger events, trigger event monitoring may implement other listeners, scanners, or handlers to retrieve information about ETL process execution status, for example, or to implement a schedule for time-based trigger events.

Execution criteria evaluation 420 may lookup execution criteria 434 for detected trigger events 454 to determine whether the ETL job for the trigger even should be executed. For example, in various embodiments, execution criteria may include criteria with respect to a source data object for the ETL job (e.g., size, data values, or other metadata or attributes of the data object). Execution criteria evaluation 420 may obtain the needed information from data catalog 360, such as data object attributes 460 (e.g., data object size, number of rows added, etc.) to evaluate execution criteria. Although not illustrated, information to evaluate other execution criteria (e.g., by accessing ETL job status information or data objects directly) may be obtained, in different embodiments, to evaluate execution criteria. For those trigger events that are evaluated and satisfy the execution criteria, an ETL job execution request 480 may be provided to ETL job execution service 340 to execute the job identified by the request 480.

Figure 5:
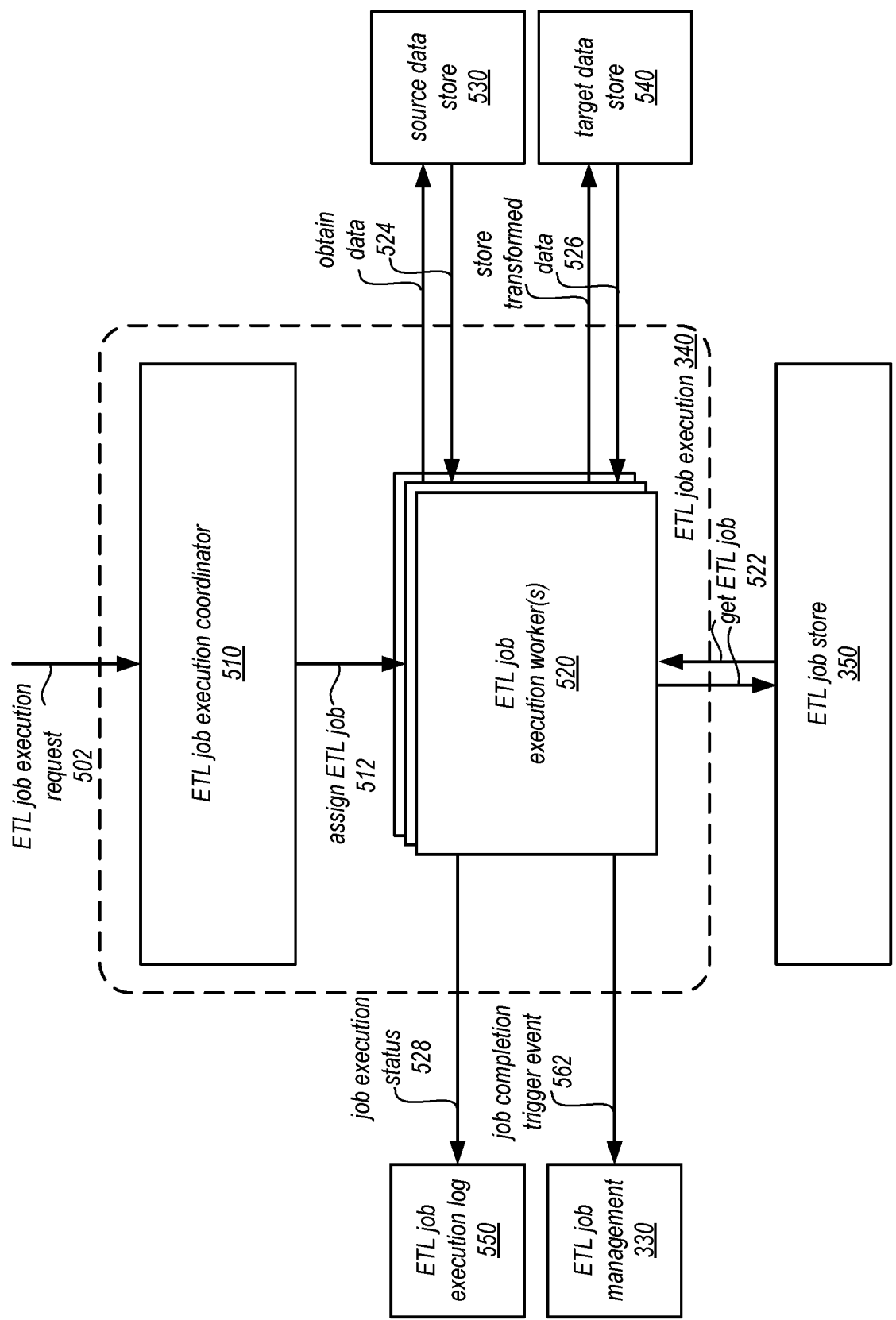
FIG. 5 is a logical block diagram illustrating interactions to execute an ETL job, according to some embodiments.

FIG. 5 is a logical block diagram illustrating interactions to execute an ETL job, according to some embodiments. ETL job execution 340 may implement an ETL job execution coordinator 510 that assigns ETL jobs 512 to one or more ETL job execution workers(s) 520 which may access source data store 530 and target data store 540 to obtain data 524, apply transformations, and store transformed data 526. ETL job execution request 502 may identify the job to execute (e.g., by include a job name or other identifier). ETL job execution coordinator 510 may determine the resources needed to execute the ETL job and assign the ETL job to one or more ETL job execution worker(s) 520.

ETL Job execution worker(s) 520 may get information 522 (including executable code, invoked operations or transformations, and other information to execute the identified ETL job) from ETL job store 350 for the ETL job. ETL job execution worker(s) 520 may then perform the ETL job in parallel or serialized fashion, obtaining data 524 from the source data store 530 (which may be a data storage service 210 of provider network 200). For example, ETL job execution worker(s) 520 may establish a connection to transfer data from source data store 530 and send one or more requests to obtain some or all of a source data object (e.g., via API requests for the source data store or via storage or transfer protocol, like secure file transfer protocol (SFTP) or an internet Small Computer Systems Interface (iSCSI)). Job execution worker(s) 520 may then apply the various transformation(s) or other operations specified by the ETL job to the obtained data.

Various transformations may be applied by ETL job execution worker(s) 520 and may include, but are not limited to, dropping one or more fields, values, or items from the source data object, converting data into a relational data format (e.g., converting lists, items or attributes, into row entries with respective column values), renaming a column, field, or attribute, selecting particular fields from the data object, or splitting fields into two different frames, locations, fields, or attributes, splitting rows, entries, or items into separate rows, entries, or items, unboxing or boxing data values, like strings, aggregating or combining data values, reducing the fidelity of data values by converting, rounding, truncating or modifying data values, or recognizing and generating custom data values (e.g., that combine values of multiple different types).

ETL job execution worker(s) 520 may establish a connection to store transformed data 526 into target data store 540 (which may be the same or different as source data store 530) via API requests for target data store 540 or via storage or a transfer protocol, like SFTP or iSCSI. ETL job execution worker(s) 520 may also access and update an ETL job execution log 550 with job execution status 528. For example, ETL job execution workers may identify the progress of the ETL job (e.g., X rows out of Y total rows in a source table processed). In this way, failures of ETL job execution worker(s) 520 may be recovered from by access ETL job execution log 550 to determine the last processed portion of a source data object. Errors and other events may be recorded for the ETL job in ETL job execution log 550, in some embodiments. ETL job execution worker(s) 520 may send trigger events 562 indicating completion of the ETL job to ETL job management 330, in some embodiments, which may be a trigger event or execution criteria for other ETL jobs.

Figure 6:
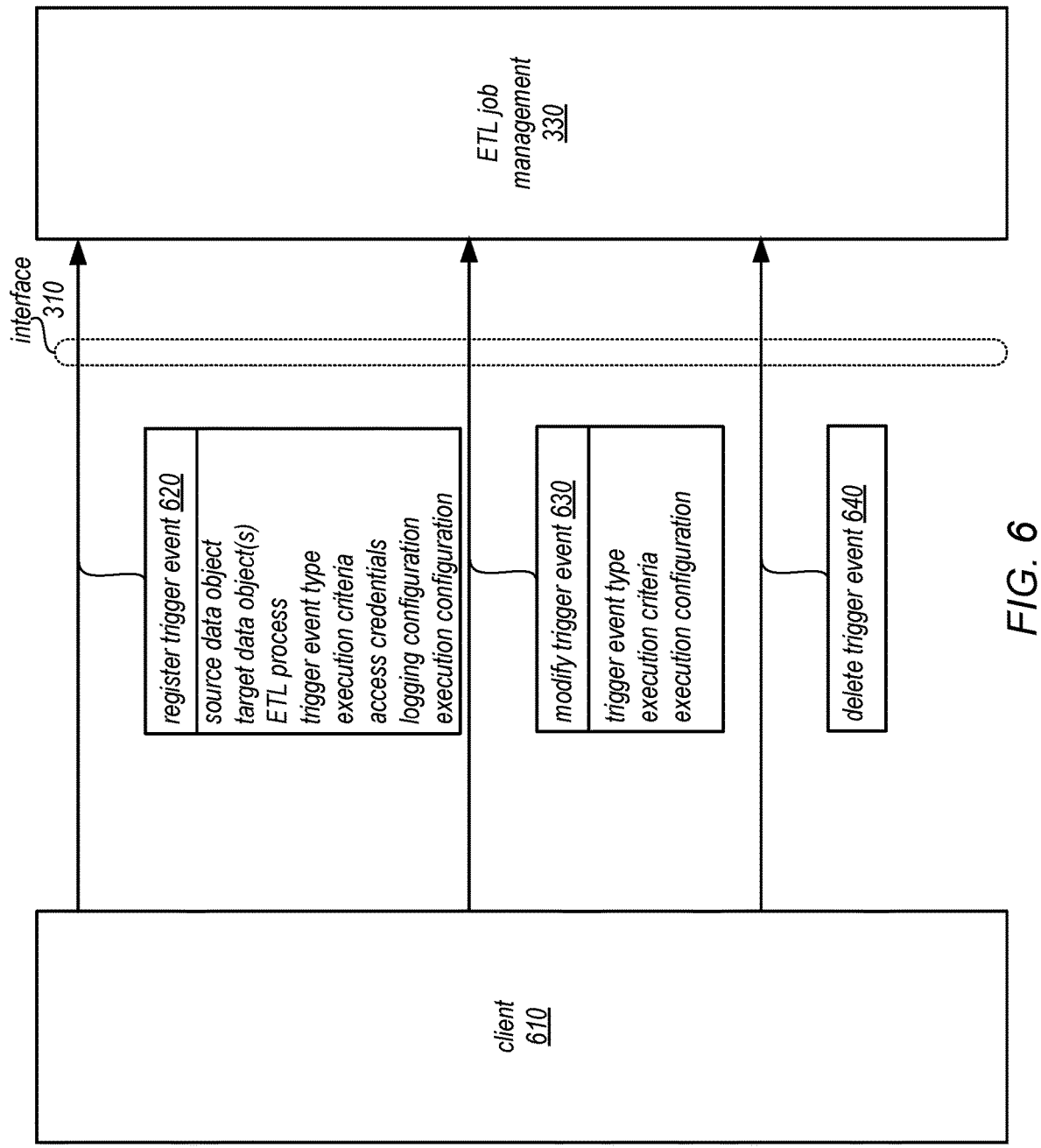
FIG. 6 illustrates example interactions to register a trigger event for an ETL job, according to some embodiments.

FIG. 6 illustrates example interactions to register a trigger event for an ETL job, according to some embodiments. As noted above, interface 310 may be a network-based, graphical, and/or programmatic interface (e.g., API), that allows clients, such as client 610 (which may be similar to clients 250 discussed above with regard to FIG. 2), access to ETL service 220. Client 610 may submit a request to register a trigger event 610 to ETL job management 330 via interface 310. The register trigger event request 610 may be sent as part of a request to create an ETL job or process for execution, or separately. Different information may be included in registration request 610 (or may be included in separate requests, not illustrated).

For example, register trigger event request 620 may include information to identify a source data object from which an ETL process may execute upon. An object identifier, name, file path, or other location may be used to specify the source data object. In some embodiments, multiple source data object(s) may be identified. Register trigger event request 620 may identify the target data object(s) to store transformed data objects as part of executing the ETL process. For example, target data object(s) may be identified by pointing a location, such as file directory, or a data object to add the target data object(s) to (e.g., as new partitions).

Register trigger event request 620 may identify the ETL process for which the trigger event applies, in various embodiments. For instance, the registration request may include a job identifier, such as a job name, pointer, index entry, or other location where the ETL process to execute may be retrieved. Register trigger event 620 may identify a type of trigger event for the ETL process. For example, a trigger event may be identified as an event triggered by events associated with data (whether the data is the source data object or another data object), including the creation, modification, or deletion of data. For example, when a new data object is stored, the arrival of the new data may trigger an event. Another trigger event type may be based on the performance or completion of another ETL job or process. For example, the completion of an ETL process to create a filtered data set may trigger the execution of an ETL process that uses the filtered data set as a source data set. Trigger events may also be time-based events. For example, a time-based trigger event may schedule the execution of the ETL process at a particular time of day, day of the week, day of the month, or day of the year.

Register trigger event request 620 may also include the various kinds of execution criteria that may be evaluated with respect to the trigger event. For example, execution criteria may evaluate the source data object upon which the ETL process performs by specifying data values, fields, rows, metadata (including tags, labels, size, or other data object attributes), as well as different calculations and/or comparisons to evaluate the execution criteria. Data size thresholds, for instance, may be evaluated, permitting or denying execution of the ETL process depending on the size of the source data object. In another example, an execution criterion may determine and compare the number of rows or attributes added as part of the source data object with row threshold. Execution criteria may include other criteria, such as evaluations of the execution status of other ETL processes, time-based evaluations (e.g., time elapsed since last execution of the ETL process), or any other evaluation to permit or deny execution of the ETL process.

In some embodiments, register trigger event request 620 may provide further information for the execution of the ETL process, such as access credentials (e.g., to obtain access to data stores), configuration of logging for the ETL process (e.g., identifying a log store or file for storing an execution for the ETL process), as well as other execution configuration information (e.g., retry attempts if the ETL process fails, timeout period for attempting to access data stores, etc.).

Client 610 may also send a request to modify a trigger event 630 to ETL job management 330 via interface 310. For example, the trigger event type may be changed (from a data-based trigger event to a time-based trigger event or a process-based trigger event). Changes may be made to the execution criteria. For example, thresholds or conditions may be altered, additional execution criteria added or execution criteria removed. Execution criteria may be modified to change which execution criteria have to be satisfied in order to execute the ETL job. For example, execution criteria may originally require that criteria A, B, and C all be satisfied to execute the ETL job. The modification request 630 may change the execution criteria to require that criteria A be satisfied along with at least one of criteria B or C.

Client 610 may also send a request to delete a trigger event 640 to ETL job management 330 via interface 310. Deletion of a trigger event may not delete the ETL job, source data object, or target data objects. But may disable monitoring for a trigger event for the ETL job.

Figure 7:
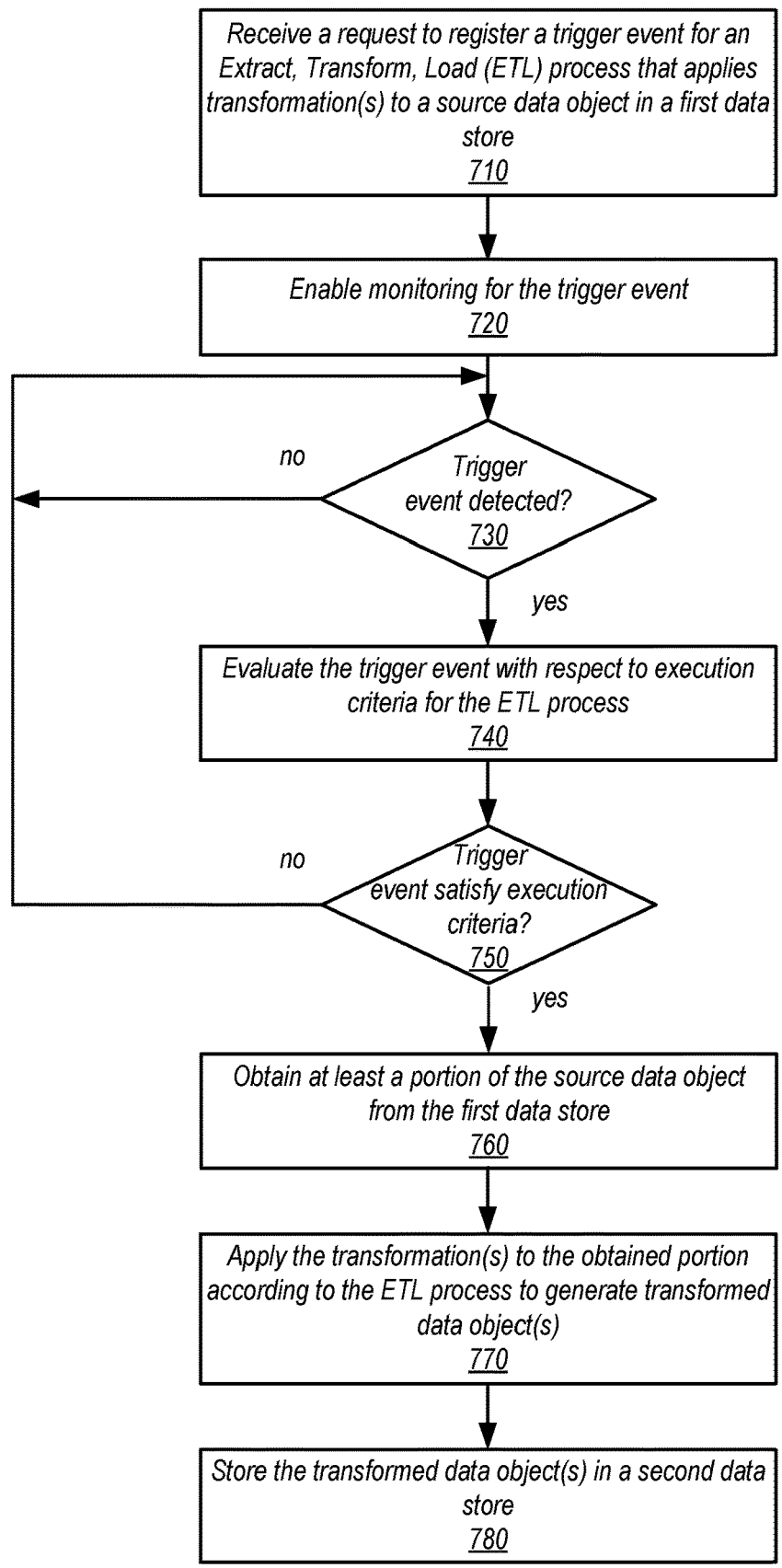
FIG. 7 is a high-level flowchart illustrating methods and techniques to implement event driven ETL processing, according to some embodiments.

Although FIGS. 2-6 have been described and illustrated in the context of an ETL service, the various techniques and components illustrated and described in FIGS. 2-6 may be easily applied to other data access or management systems in different embodiments that may facilitate ETL processing operations. Stand-alone ETL processing systems are an example of another embodiment that may be implemented in private networks or systems to perform similar techniques to those described above. As such, FIGS. 2-6 are not intended to be limiting as to other embodiments of a system that may implement event driven ETL processing. FIG. 7 is a high-level flowchart illustrating methods and techniques to implement event driven ETL processing, according to some embodiments. Various different systems and devices may implement the various methods and techniques described below, either singly or working together. For example, an ETL service such as described above with regard to FIGS. 2-6 may be configured to implement the various methods. Alternatively, a combination of different systems and devices, such as a storage subsystem that manages access to data stored in directly attached storage devices may transform data using ETL processing the below techniques. Therefore, the above examples and or any other systems or devices referenced as performing the illustrated method, are not intended to be limiting as to other different components, modules, systems, or configurations of systems and devices.

As indicated at 710, a request may be received to register a trigger event for an Extract, Transform, Load (ETL) process that applies transformation(s) to a source data object in a first data store, in some embodiments. The request may be received via a programmatic interface, such as discussed above according to FIG. 6 and may indicate various information to associate with or configure the trigger event. For example, the request may indicate or specify the source data object (or multiple source data objects) from which data is obtained upon which ETL processing is performed, the target data object(s) generated as a result of the ETL processing (e.g., new partitions of table or new files in a directory), the type of trigger event (e.g., data arrival, data creation, data update, etc.), execution criteria (e.g., criteria with respect to the source data object, criteria with respect to the timing of the trigger event, criteria with respect to the execution status of other ETL processing jobs), access credentials for executing the ETL process (e.g., identity tokens, username/password information, security role or other information to access source or target data objects), logging configuration (e.g., identifying a location for an event log for the ETL process), or execution configuration (e.g., indicating the number of attempts to execute the ETL process in the event of failure).

As indicated at 720, in response to receiving the request monitoring may be enabled for the trigger event. For example, in one embodiment, a monitoring agent or listener may be created to receive updates or status changes to the source data object (e.g., such as updates to a data catalog for the source data object, as discussed above with regard to FIG. 4). The updates may be monitored to detect a trigger event. In another embodiment, a periodic (or aperiodic) scan, poll, or other check may be performed with respect to the source data object. For example, a header or other metadata for the source data object may be read to determine whether the source data object has been modified since a last check. Monitoring for trigger events may be enabled differently for different types of triggering events. For trigger events that are triggered by a time (e.g., daily, weekly, or monthly process schedule, or time elapsed since a last ETL process was initiated, attempted, or completed), monitoring may include implementing a timer or other mechanism to determine whether the trigger event occurred.

As indicated at 730, a trigger event may be detected, in some embodiments. For example, a new data object may be stored in a location in the data store or an addition to or modification of data may be performed with respect to a data object in the data store. In at least some embodiments, the source data object may be a table or other data object that includes multiple partitions and the detected trigger event may be the arrival of an additional partition for the table.

As indicated at 740, the trigger event may be evaluated with respect to execution criteria for the ETL process. As noted above, execution criteria may allow a data administrator to tailor the execution of the ETL process to different circumstances or events for data, such as various stages in a data life cycle. Execution criteria may include any condition permitting or denying execution of the ETL process. For example, execution criteria may be used to evaluate the source data object, such as the size, format, or other attribute. An execution criterion may deny execution of the ETL process for source data objects less than 512 megabytes in size, in one embodiment.

In at least some embodiments, metadata, such as user-defined tags, labels, or other descriptors may be evaluated with respect to execution criteria. For example, data objects tagged "test" or "correction" may be compared with a set of tags (e.g., "production," "complete," or "results"). If the tag matches one of the tags in the set, then the execution criteria may be satisfied. In some embodiments, data values within the source data object may be evaluated with respect to a data value criterion. For example, an average or standard deviation may be calculated for field values in one or more columns of a data object (e.g., table). If the average or standard deviation is greater than a threshold value, then the execution criterion may be satisfied. In at least some embodiments, execution criteria may include evaluations of other ETL processes, such as the execution status of an ETL process (e.g., failed, completed, paused, etc.). For example, one execution criterion may be an evaluation as to whether an ETL process applied to the source data object (or another data object), completed successfully.

Different combinations of execution criteria may be specified for a trigger event. In some embodiments, execution criteria may be specified in a request to register the trigger event. In other embodiments, default execution criteria (e.g., dependent on the trigger event type) may be assigned to the trigger event. In some embodiments, combinations of execution criteria may be satisfied or not satisfied, and execution of the ETL process may still be allowed. For example, execution criteria may include a further criterion that permits execution of the ETL process if 2 or more execution criteria out of a larger group of execution criteria are satisfied.

If execution criteria are not satisfied, as indicated by the negative exit from 750, then monitoring for the trigger event may continue. For trigger events that satisfy the execution criteria, the ETL process may be executed. For example, as indicated at 760, at least a portion of the source data object may be obtained from the first data store. Different records, files, partitions or other portions may be read from the first data store for processing. As indicated at 770, the transformation(s) may be applied to the obtained portion according to the ETL process in order to generate one or more transformed data object(s). For example, different transformations to filter, modify, rearrange, combine, delete, convert, other any other change to the portion may be performed to generate the transformed data objects. Transformed data may be split into multiple data objects or stored in a single transformed data objects. In some embodiments, transformed data object(s) may be a partition or other addition to an existing data set (e.g., a partition for an existing table).

Once the transformed data object(s) are generated, the transformed data objects may be stored in a second data store, as indicated at 780. For example, the transformed data objects may be stored in a different storage system or service (e.g., a different database system than the first data store). In some embodiments, the second data store may be the same as the first data store. For example, the transformed data object(s) may be stored in a different location in the first data store (e.g., in a different file directory). In at least some embodiments, an event may be triggered by storing the transformed data object(s) in the second data store. For example, the event may be another trigger event for another ETL process. A request may be sent to update a data catalog for the transformed data object(s) which may be detected, triggering the other trigger event.

In some embodiments, a retry configuration or threshold may be implemented for the ETL process. For example, if an ETL process is allowed to execute (after satisfying the execution criteria) but fails (e.g., in attempting to obtain data from the source data object, to apply transformations to the source data object, or to store transformed data objects), the retry configuration may direct one ear more subsequent attempts to execute the ETL process. In this way, the ETL process may be executed without waiting for the detection of another trigger event, which may be beneficial in scenarios where a chain of ETL processes are dependent upon the completion of prior ETL processes.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
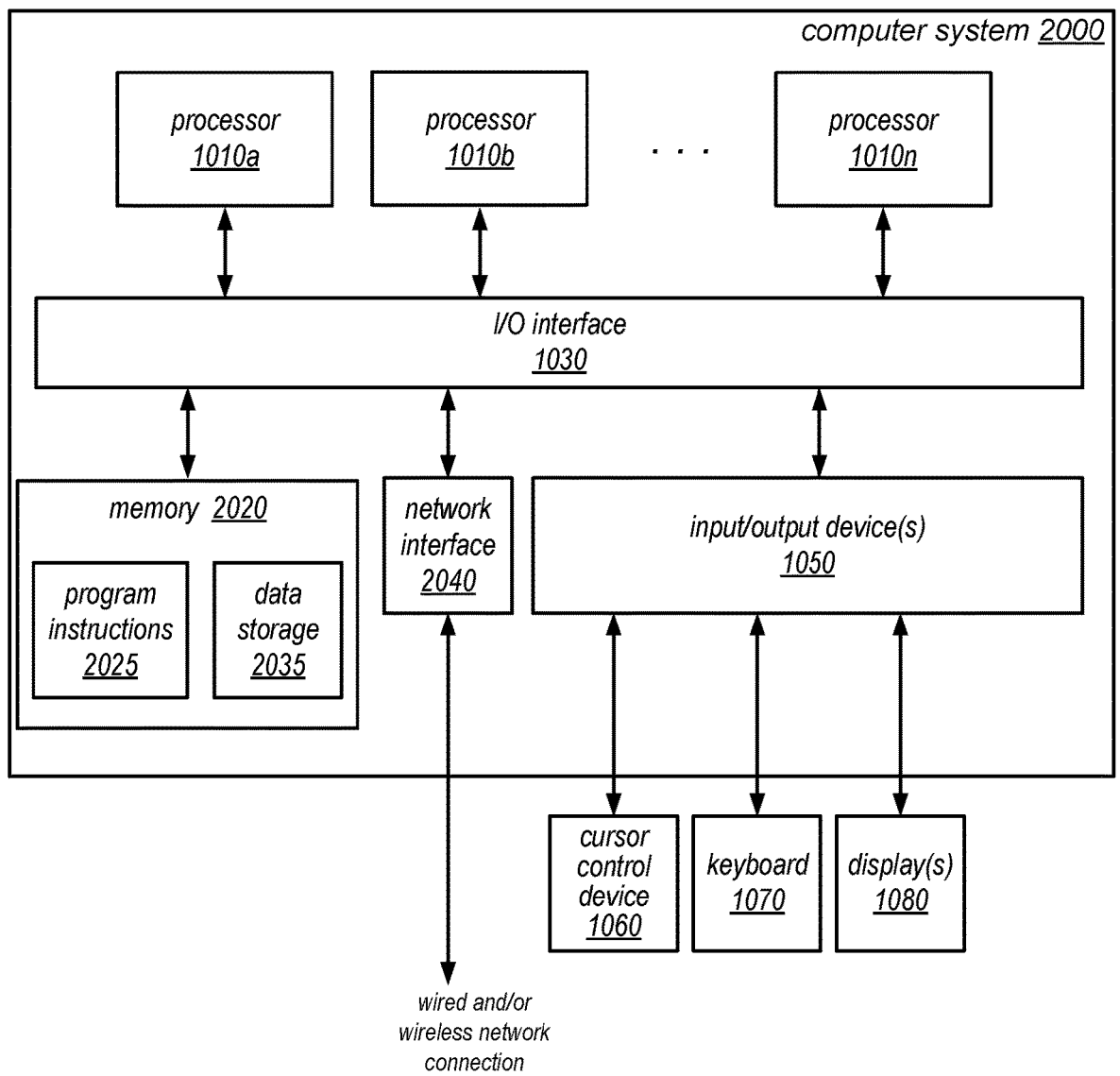
FIG. 8 illustrates an example system configured to implement the various methods, techniques, and systems described herein, according to some embodiments.

Embodiments of event driven ETL processing as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within an ETL system may present ETL services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor;
a memory to store program instructions that, if executed, cause the at least one processor to perform a method, comprising:
monitoring a first data store to detect a trigger event for executing an Extract, Transform, Load (ETL) process comprising one or more transformations upon a source data object stored in the first data store;
determining whether the ETL process should be executed upon the source data object stored in the first data store based on evaluating whether the trigger event satisfies one or more execution criteria for the ETL process, wherein evaluating the trigger event comprises comparing an attribute of the source data object with respect to a threshold as one of the one or more execution criteria;
in response to determining that the ETL process should be executed:
obtaining at least a portion of the source data object from the first data store;
applying the one or more transformations to the obtained portion of the source data object according to the ETL process to transform the obtained portion of the source data object from a first format to a second format to generate one or more transformed data objects; and
storing the transformed data objects that include the obtained portion of the source data object in the second format in a second data store.

2. The system of claim 1, wherein the method further comprises:
receiving a request to register the trigger event for the ETL process; and
enabling monitoring for the trigger event according to the registration of the trigger event, wherein the monitoring detects the trigger event.

3. The system of claim 1, wherein detecting the trigger event to execute the ETL process comprises detecting an update to a data catalog for the source data object.

4. The system of claim 3, wherein the at least one processor and the memory are implemented as part of an ETL service offered by a provider network, wherein the data catalog is maintained as part of the ETL service, wherein the update to the data catalog is a received via a network-based interface for the ETL service, and wherein the first data store and the second data store are implemented as part of one or more data storage services offered by the provider network.

5. A method, comprising:
monitoring a first data store to detect a trigger event for executing an Extract, Transform, Load (ETL) process comprising one or more transformations upon a source data object stored in the first data store;
determining whether the ETL process should be executed upon the source data object stored in the first data store based on evaluating whether the trigger event satisfies one or more execution criteria for the ETL process, wherein evaluating the trigger event comprises comparing an attribute of the source data object with respect to a threshold as one of the one or more execution criteria;
in response to determining that the ETL process should be executed:
obtaining at least a portion of the source data object from the first data store;

applying the one or more transformations to the obtained portion of the source data object according to the ETL process to transform the obtained portion of the source data object from a first format to a second format to generate one or more transformed data objects; and storing the transformed data objects that include the obtained portion of the source data object in the second format in a second data store.

6. The method of claim 5, wherein the method further comprises:
receiving a request to register the trigger event for the ETL process; and
enabling monitoring for the trigger event according to the registration of the trigger event, wherein the monitoring detects the trigger event.

7. The method of claim 5, wherein the trigger event for the ETL process indicates that the source data object is a new data object stored in the first data store.

8. The method of claim 5, wherein detecting the trigger event to execute the ETL process comprises detecting an update to a data catalog for the source data object.

9. The method of claim 5, wherein evaluating the trigger event comprises determining whether a tag attribute for the source data object matches one or more tag attribute values permitting execution of the ETL process.

10. The method of claim 5, wherein evaluating the trigger event comprises evaluating one or more data values of the source data object with respect to a data value criteria of the one or more execution criteria.

11. The method of claim 5, wherein evaluating the trigger event comprises evaluating a status of a previously initiated ETL process performed upon the source data object or another data object.

12. The method of claim 5, wherein the one or more execution criteria are some of a plurality of execution criteria evaluated with respect to the trigger event, wherein at least one of the plurality of execution criteria is not satisfied with respect to the trigger event.

13. The method of claim 5, wherein the first data store and the second data store are implemented as part of one or more data storage services offered by a provider network, wherein the detecting the trigger event, the evaluating the triggering event, the obtaining the portion of the source data object, the applying the transformations, and the storing the transformed data objects are performed by an ETL service offered by the provider network.

14. A non-transitory, computer-readable storage medium, storing program instructions that when executed by one or more computing devices cause the one or more computing devices to implement:
monitoring a first data store to detect a trigger event for executing an Extract, Transform, Load (ETL) process comprising one or more transformations upon a source data object stored in the first data store;
determining whether the ETL process should be executed upon the source data object stored in the first data store based on evaluating whether the trigger event satisfies one or more execution criteria for the ETL process, wherein evaluating the trigger event comprises comparing an attribute of the source data object with respect to a threshold as one of the one or more execution criteria;
in response to determining that the ETL process should be executed:
obtaining at least a portion of the source data object from the first data store;
applying the one or more transformations to the obtained portion of the source data object according to the ETL process to transform the obtained portion of the source data object from a first format to a second format to generate one or more transformed data objects; and
storing the transformed data objects that include the obtained portion of the source data object in the second format in a second data store.

15. The non-transitory, computer-readable storage medium of claim 14, wherein the source data object is a table and wherein the trigger event for the ETL process indicates that a new partition of data for the table is stored in the first data store.

16. The non-transitory, computer-readable storage medium of claim 14, wherein, in detecting the trigger event to execute the ETL process, the program instructions cause the one or more computing devices to implement detecting an update to a data catalog for the source data object.

17. The non-transitory, computer-readable storage medium of claim 14, wherein evaluating the trigger event comprises evaluating a size of the source data object with respect to a size threshold as one of the one or more execution criteria.

18. The non-transitory, computer-readable storage medium of claim 14, wherein the program instructions cause the one or more computing devices to further implement:
receiving a request to register the trigger event for the ETL process; and
in response to receiving the request to register the trigger event, enabling monitoring for the trigger event, wherein the monitoring detects the trigger event.

19. The non-transitory, computer-readable storage medium of claim 18, further comprising:
prior to performing the obtaining, the applying, and the storing, attempting to execute the ETL process, wherein the attempt to execute the ETL process fails;
performing the obtaining, the applying, and the storing according to a retry configuration for the ETL process, wherein the retry configuration directs one or more further attempts to execute the ETL process without detecting another trigger event for the ETL process.

20. The non-transitory, computer-readable storage medium of claim 14, wherein the program instructions cause the one or more computing devices to further implement:
upon completion of the ETL process, triggering another trigger event for another ETL process performed upon the source data object or the transformed data objects.

* * * * *